Oct. 31, 1961 R. TONELLI 3,006,453
CONVEYER TRANSFER MECHANISM
Filed May 20, 1957 4 Sheets-Sheet 1
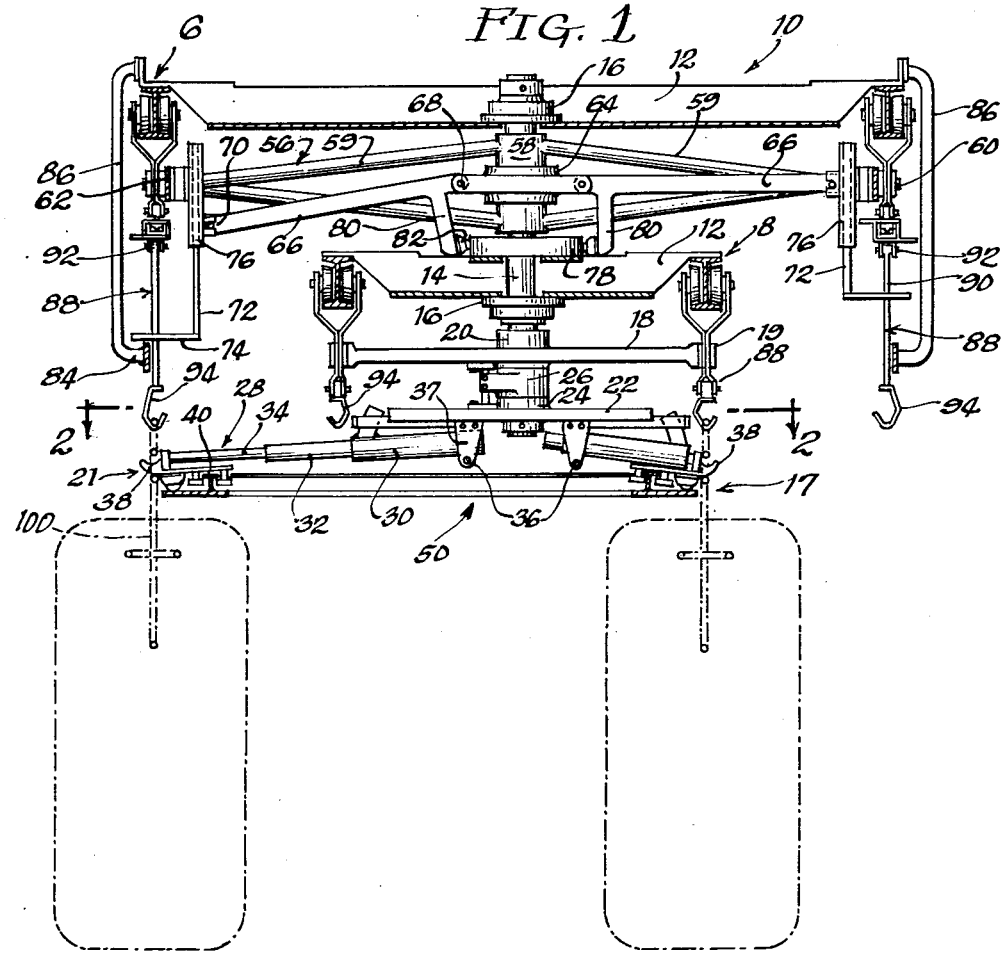
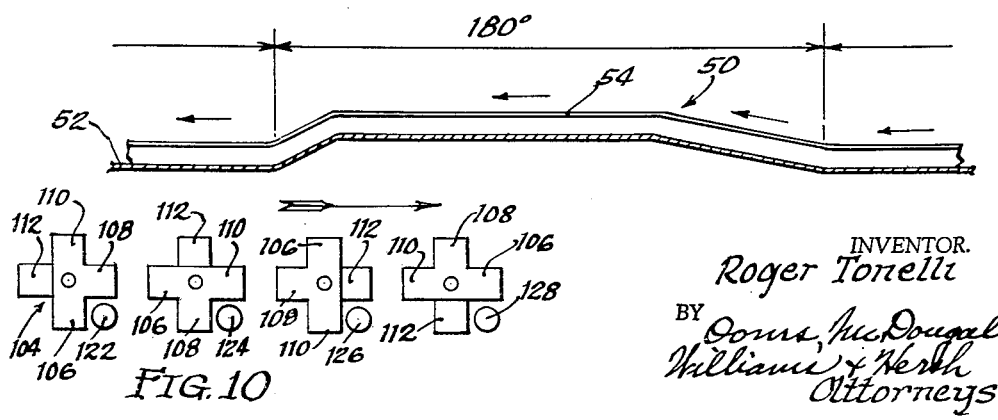
INVENTOR.
Roger Tonelli
BY
Attorneys

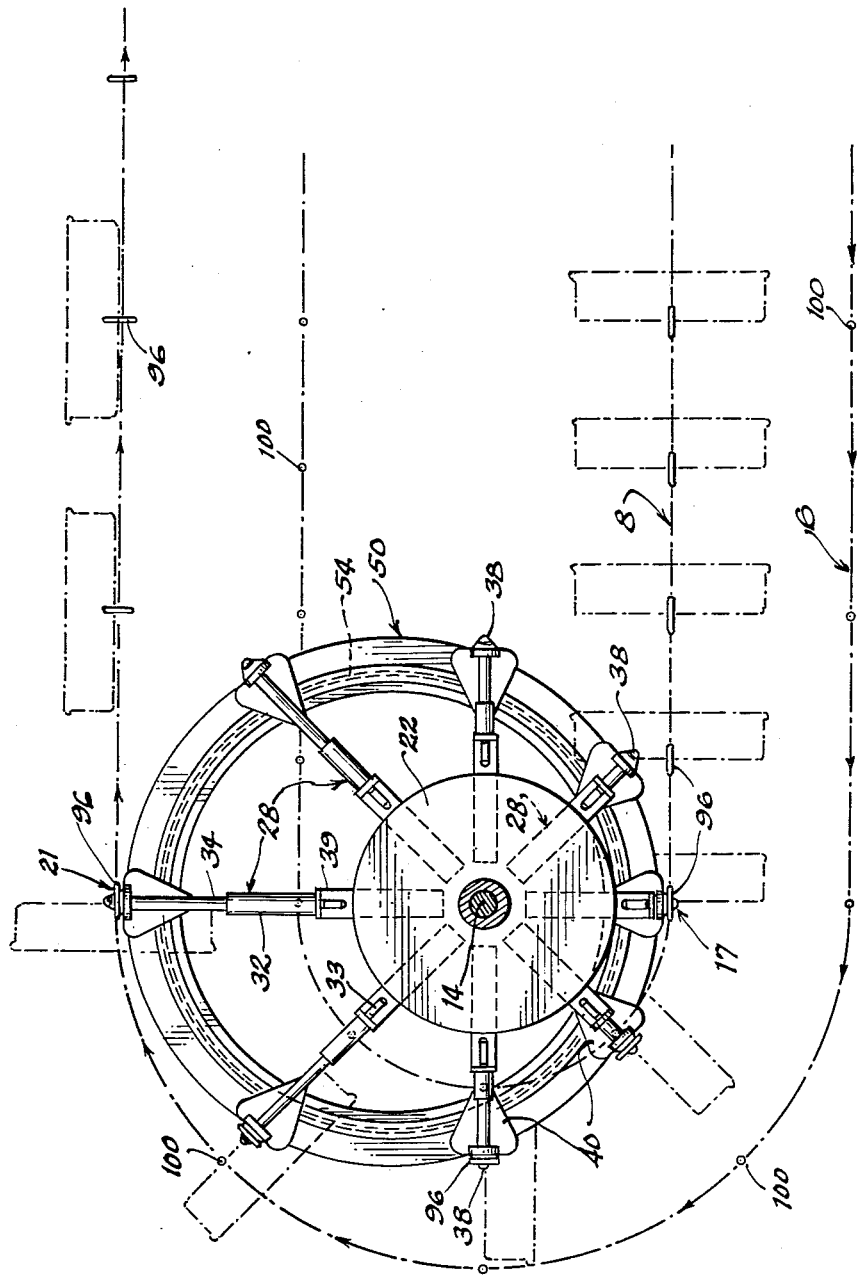

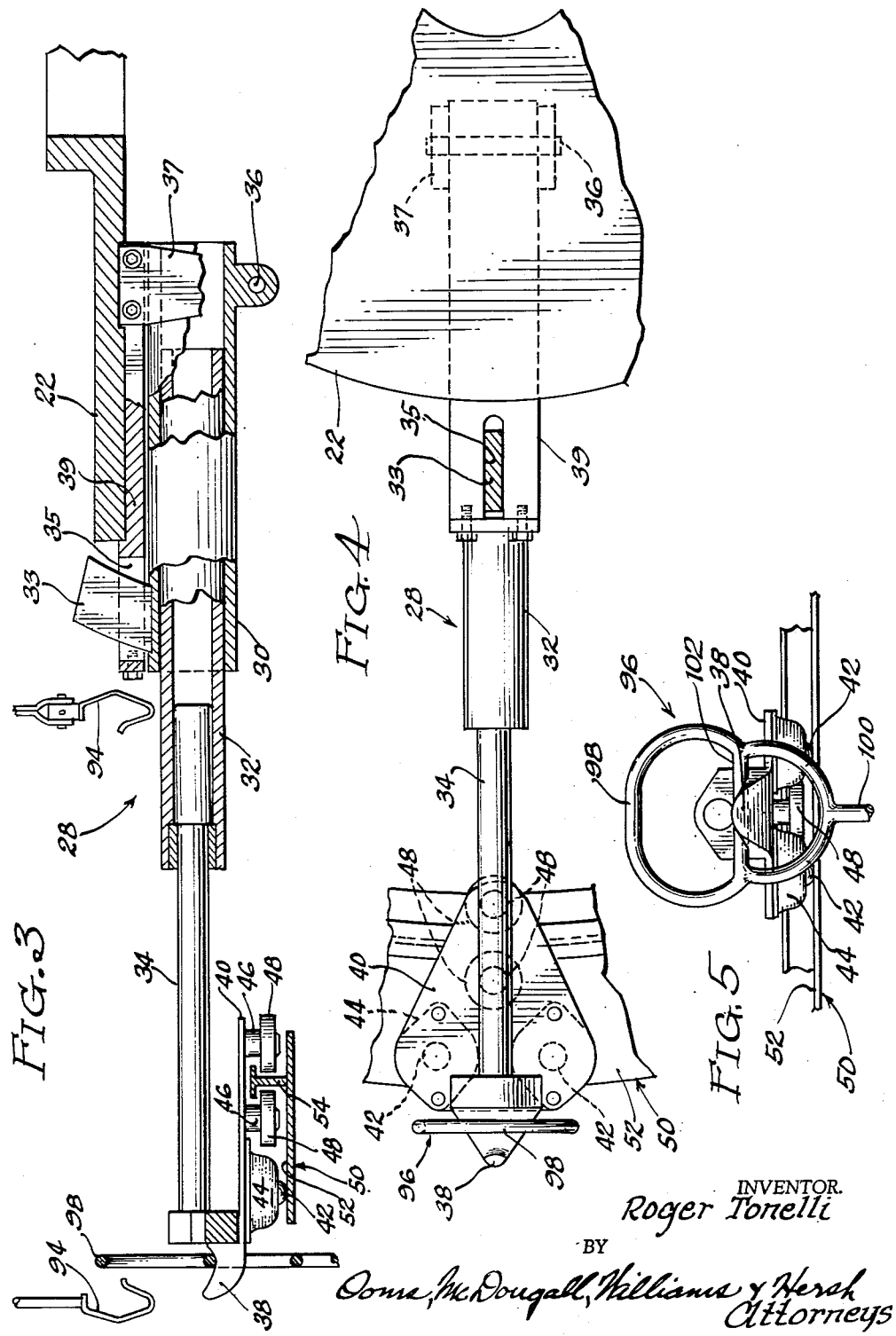

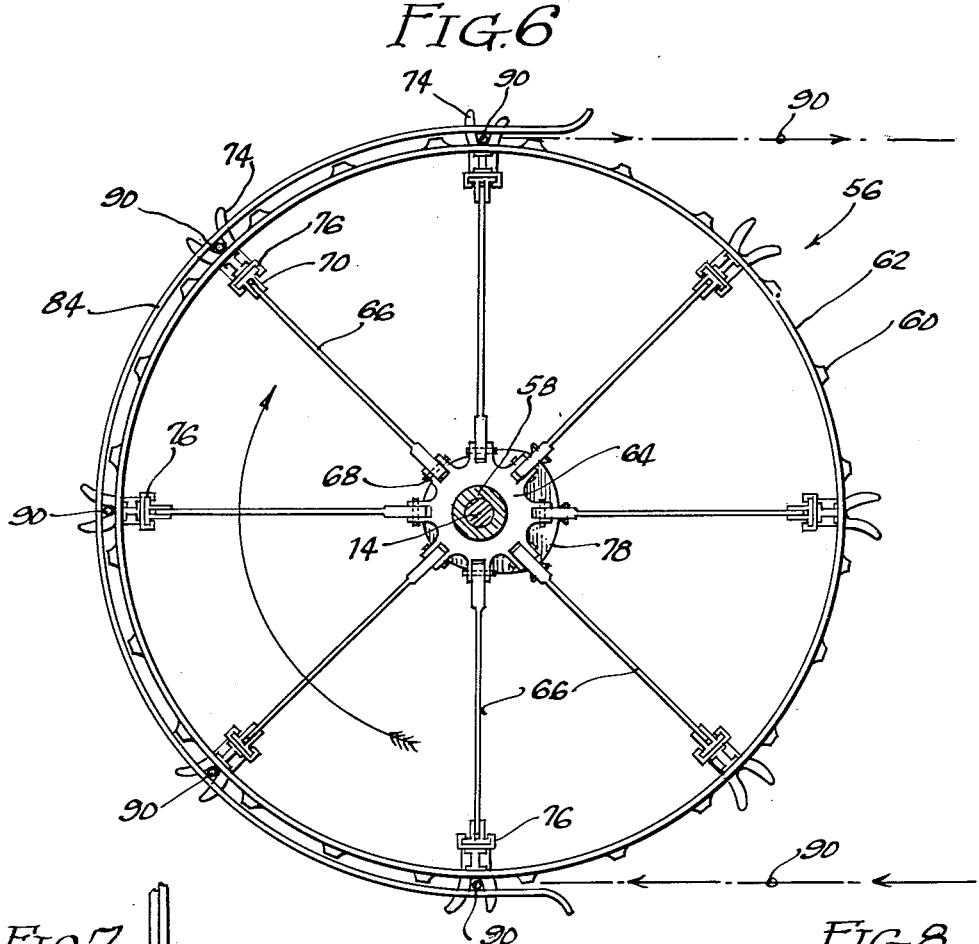
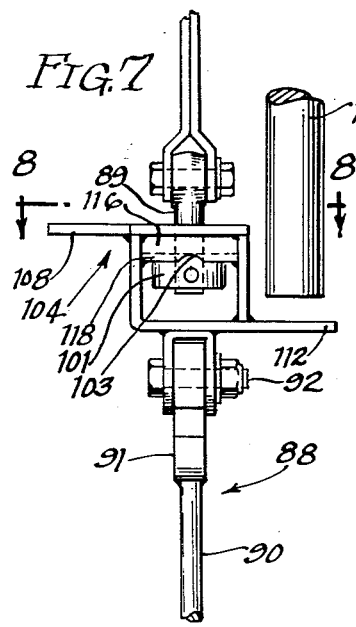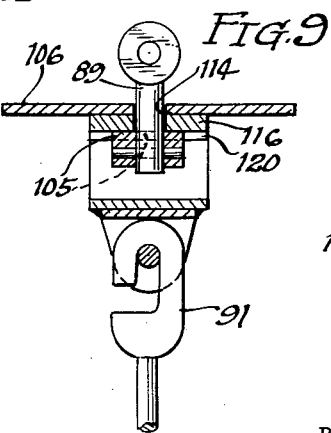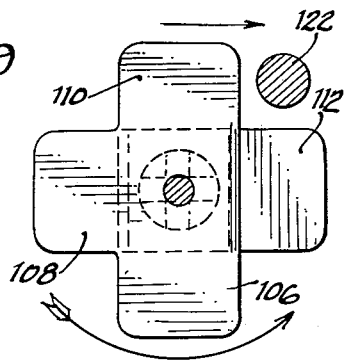

United States Patent Office 3,006,453
Patented Oct. 31, 1961

3,006,453
CONVEYER TRANSFER MECHANISM
Roger Tonelli, Chicago, Ill., assignor to Radio Steel & Mfg. Co., Chicago, Ill., a corporation of Illinois
Filed May 20, 1957, Ser. No. 660,163
15 Claims. (Cl. 198—25)

This invention relates to a conveyer system and more particularly to an apparatus for automatically transferring material from one moving conveyer system to another.

Conveyer systems and particularly those used in factories have, in the past, created severe problems for plant management. This was because improvements in industrial techniques caused changes in material treating processes applied to the article carried by the conveyer system. One way in which these changes in the material treating processes manifested themselves was by causing changes in treating time during the various stages of manufacture. Heretofore the speed of the conveyer system was governed by the speed of the slowest process applied to the article being made, which was frequently below the design speed of the conveyer system. This meant that unless the improved industrial techniques involved the slowest process, there was no advantage from a time standpoint in applying these newer industrial techniques to the other stages of manufacture. In addition, these changes in material treating process produced changes in the size and weight of the material applied to the article being made, and these different processes frequently required a different spacing of the material on the conveyer system. The cost of modifying the entire conveyer system to take advantage of all the changes imposed by these improved techniques was frequently so high as to prohibit their successful employement.

Another problem connected with conveyer systems for factories occurs when a treating area involves the deposit of material such as paint on the article being made. Inevitably a portion of the deposited material settles on the conveyer system and after the entire conveyer system has passed through that area a few times, it becomes covered with the substance. The thickness of the deposited material increases until it affects the operation of the conveyer system, requiring it to be shut down for cleaning.

The ideal solution to these difficulties would involve using a main conveyer system only for the transportation of the article of manufacture to the various treating areas in the plant, and then erecting spur conveyer systems for the actual transportation of the article through the treating area. In this way improvements in industrial techniques could be readily incorporated in the individual small spur conveyer systems, and problems caused by the deposit of treating material on the conveyer system would be restricted to one small spur conveyer system.

Since the various treating areas have different speed, spacing and support length requirements, the problem to be solved is the design of a mechanism which can automatically transfer the article being made from one moving conveyer system to another having different operating speeds, spacing requirements and different sized material supports.

Therefor the principal object of this invention is to devise an apparatus for automatically transferring material from one moving conveyer system to another where the speeds, the separation of the material on the conveyer, and the support member length are different.

An additional object of this invention is to devise an apparatus for automatically transferring material from one conveyer system to another at the speed the material arrives on one conveyer system and regardless of the speed of the other conveyer system.

Another object of this invention is to devise an apparatus for automatically transferring material from one conveyer system to another at the speed the material arrives on one conveyer system and regardless of the spacing requirements and material support lengths on the other conveyer system.

Yet another object of this invention is to devise a mechanism for automatically transporting material from one point to another.

Still another object of this invention is to devise an apparatus for synchronizing the movement of material holding mechanisms on a transfer apparatus with material support members on a plurality of conveyer systems moving at different speeds.

A further object of this invention is to devise an apparatus for synchronizing the movement of material holding mechanisms on a transfer apparatus with support members on a plurality of conveyer systems, which utilizes a plurality of extensible material holders mounted at one end on a rotating support and riding in a cam guide track at the other end.

A still further object of this invention is to devise a transfer station for conveyer systems having means synchronized with the movement of the conveyer systems for engaging and steadying the support members on the conveyer system as they arrive at the transfer station.

Yet another object of this invention is to devise an apparatus associated with a conveyer system for automatically aligning material support members pivotally connected to a conveyer system.

Yet a further object of this invention is to devise a transfer station for transferring material from one moving conveyer system to another which is simple to construct, mechanically strong, and economical to make.

These and other objects of this invention will be better understood when read in the light of the accompanying drawings and specification, wherein—

FIGURE 1 is a front elevation partly in section of the transfer station;

FIGURE 2 is a section taken on the line 2—2 of FIGURE 1 with a schematic top view of the arrangement of the conveyer systems superimposed;

FIGURE 3 is a side view partly in section of one of the material holders in the transfer station showing its pivotal connection at one end to the rotating support disk, and showing the extensible member riding in said guide track;

FIGURE 4 is a top view of the material holder;

FIGURE 5 is an end view of the material holder showing its engagement with the double eyelet connected to the material transported by the conveyer systems;

FIGURE 6 is a top view partly in section of the sprocket wheel and the pivotally connected steadying members mounted on it;

FIGURE 7 is a detail of the material support member pivotally connected to the conveyer system showing the attached automatic aligning apparatus and associated turning pin;

FIGURE 8 is a sectional view taken on the line 8—8 of FIGURE 7;

FIGURE 9 is an additional detail of the supporting member showing how a portion of the supporting member can be quickly detached from the conveyer system, and showing the arrangement of the aligning grooves in the aligning mechanism;

FIGURE 10 is a schematic arrangement of the aligning apparatus showing its mode of operation; and FIGURE 11 is a developed view of the cam guide track.

Referring now to FIGURE 1, a transfer station indicated generally at 10 for automatically transferring material from one moving conveyer system to another comprises fixed supports 12. A support shaft 14 is rigidly secured to the fixed supports 12 by collar 16. A first sprocket wheel 18 having a hub 20 is rotatably mounted on shaft 14. A support disk 22 having an integral hub 24 is rigidly secured to the hub 20 of the sprocket wheel 18 by means of the connecting collar 26. With this arrangement, the rotation of sprocket wheel 18 causes support disk 22 to rotate on shaft 14.

As seen in FIGURES 1 and 2, a plurality of material holders indicated generally as 28 are mounted on the support disk 22 in uniformly spaced angular relationship. As shown in FIGURES 3 and 4, each material holder includes a base member 30, an intermediate member 32 and an extensible member 34. Each base portion is pivotally connected to the support disk 22 by means of pivots 36 in pivot support 37 to permit movement of the material holders in a plane transverse to the plane of rotation of the support disk 22.

A material holding hook 38 is mounted on the end of the extensible member 34. This extensible member also has a guide portion adapted to ride on a cam track. As shown clearly in FIGURES 3 and 4, the guide portion includes a substantially triangular support plate 40. A pair of roller support bearings 42 are mounted in bearing supports 44 which are secured to the support plate 40. These rollers support bearings are adapted to ride on the surface 52 of a cam guide plate 50 and are in spaced relationship to prevent the extensible member 34 from rotating in base member 30. A pair of support shafts 46 are mounted on said support plate 40. These shafts extend perpendicular to the extensible member 34, see FIGURE 4. A pair of guide wheels 48 are rotatably mounted on the support shafts 46 for engagement with the rail 54 of the cam guide plate 50.

To further steady the material holders 28, an arcuate guide member 33 is rigidly attached to base member 30. This guide member 33 penetrates a guide slot 35 in hinge support plate 39, see FIGURE 3, to prevent the base member 30 from rotating on its longitudinal axis as it pivots on pivot member 36.

A cam guide track indicated generally at 50 comprises a flat cam surface 52 and a guide rail 54, see FIGURES 3 and 11. In the example shown, the guide track happens to be circular in configuration, see FIGURE 2. The cam guide track 50 is rigidly connected to the fixed supports 12 by support means (not shown). The engagement between the guide portion on the extensible member 34 and the cam guide track is clearly shown in FIGURE 3. As seen in FIGURE 11, the cam guide track rises and falls, and this causes the material holders to pivot as the guide portions ride along on the surface of the guide track.

In operation to this point, and referring to FIGURE 1, it can be seen that the main conveyer system, indicated generally at 8, has depending support members 88 which are substantially tangent to and in engagement with projections 19 on sprocket wheel 18 and to the cam guide track 50 at the first transfer point 17. Since the conveyer system 8 is moving, this engagement causes the sprocket wheel 18 to rotate with the same linear velocity, and the rotation of the sprocket wheel 18 causes the support disk 22 to rotate with the same angular velocity. The rotation of the support disk 22 causes the guide portion of the material holders 28 to ride on the cam guide track 50. Since the path of the cam guide track is at varying distances from the axis of the support disk, the rotation of the material holder and the cam guide track extends and compresses the material holder, in accordance with the distance of the cam guide track from the axis of the rotating support disk 22. Since the angular velocity of the material holders is constant, and since their length varies, it follows that the linear velocity of the material holders is changing in proportion to the distance of the cam guide track from the axis of the support disk.

As seen in FIGURE 1, a spur conveyer system, indicated generally at 6, is in radially and axially spaced relation to the main conveyer system 8 and has depending support members 88 substantially tangent to the cam guide track 50 at the second transfer point 21. This point happens to be about twice the distance from the axis of the support disk 22 of the first transfer point 17. This means that in order to synchronize the linear velocity of the material holder 28 at transfer point 21 with the velocity of the spur conveyer system, the spur conveyer system must move at twice the velocity of the main conveyer system 8, or conversely, the ratio of the distance of the cam guide track to the axis of the rotating support disk 22 at the first transfer point to the distance of the cam guide track to the axis of the rotating support disk 22 at the second transfer point must equal the ratio of the speeds of the main conveyer system to the spur conveyer system in order for the material holders on the support disk to be synchronized with the speeds of both conveyer systems.

Referring to FIGURE 6, a second sprocket wheel, indicated generally at 56, and having a hub 58, is rotatably mounted on fixed shaft 14. Projections 60 are uniformly spaced around the periphery 62 of the wheel. The hub and periphery of the sprocket wheel are rigidly connected by spokes 59, see FIGURE 1. The sprocket wheel is tangent to the spur conveyer system 6 so the movement of the spur conveyer system causes sprocket wheel 56 to rotate with a peripheral velocity equal to that of the spur conveyer system, for purposes to be described below.

As seen in FIGURE 1, a support collar 64 is rigidly secured to hub 58. A plurality of rod members 66 are pivotally connected to the periphery of the support collar in uniformly spaced angular relation. The other end 70 of the rod members is pivotally connected to a vertical slide bar 72, see FIGURE 1. An outwardly projecting fork member 74 is rigidly secured to the lower end of the slide bar. A plurality of depending guide ways 76, one for each slide bar, are rigidly secured to the periphery 62 of the sprocket wheel 56. The slide bars 72 are positioned to ride in said guide ways. A cam surface 78 is rigidly secured to fixed supports 12 and shaft 14. The rod members 66 have a depending portion 80 with an inwardly projecting bearing 82 riding on the cam surface. With this arrangement, if, during the rotation of sprocket wheel 56, the depending fork members 74 should approach some obstacle such as a portion of the fixed support 12, they may be automatically lifted over the obstacle by providing a radially extending protuberance at the appropriate part of the cam surface 78. As seen in FIGURE 1, when bearing 82 of rod members 66 encounters such a protuberance, the rod member 66 is pivoted at 68 raising end 70 and the depending fork 72 enough to clear the obstacle.

A fixed guide strip 84 is rigidly secured to fixed support 12 by supports 86, see FIGURES 1 and 6. This strip extends parallel to the portion of the spur conveyer 6 in the transfer station. In the example shown it happens to be semicircular. The guide strip is positioned so the rather long pivotally connected support members 88 on the spur conveyer system 6 pass between the periphery 62 of the sprocket wheel 56 and the guide strips 84. Since, as stated above, the peripheral velocity of the sprocket wheel 56 is equal to the velocity of the spur conveyer system 6, and the size of the sprocket wheel 56 is known, the angular spacing of the fork members 74 can be easily set to be synchronized with the arrival of the support members 88 on the spur conveyer system. Then, as indicated in FIGURE 1, the shank 90 of the support member 88 is held between guide strips 84 and the tines of the fork member 74. This arrangement eliminates swaying movements of the support member 88 and steadies it for receiving material supplied to it by the transfer station. This steadying mechanism can be improved by providing a protuberance on cam surface 78 positioned so the fork member 74 is raised as high as possible toward the pivotal connection 92 of the support member 88 at the point the support member enters the transfer station. Since the sway of the support member 88 approaches 0 at its pivotal point, there is very little movement there. This permits the tines of the fork member 74 to embrace shank 90 of support member 88 with a high degree of precision. Then as the fork member rotates around sprocket wheel 56 in synchronization with the spur conveyer system 6, the up and down movement of the work 74 dampens out the swaying movements in the support member.

The actual mode of transfer from the main conveyer system 8 to the spur conveyer system 6 can now be described. As seen in FIGURES 1 and 3, each support member 88 secured to a conveyer system terminates in a hook 94. This hook normally engages the upper cross member 98 of a two level support or double eyelet 96, see FIGURE 5. A shank 100 depends from the bottom of the support eye and terminates in a hook (not shown) directly engaging the material carried by the conveyer system. During transfer, the material holding hook 38 on the end of the material holder 28 is synchronized as described above by the cam guide track and the rotation of the support disk 22 so it engages the cross member 102 of the double eyelet 96 at the first transfer station 17, see FIGURE 5. Then the cam guide track is shaped to cause the material holder 28 to rise slightly and bear the entire weight of the material carried by the support member 88 and this is one of the reasons why the material holders are pivotally mounted on the support disk 22. Continued movement of the material holders along the cam guide track carries the depending material away from the main conveyer system, and moves it outwardly toward the spur conveyer system where it arrives in synchronization, as described above, with support members 88 on the spur conveyer system. The material holders riding in the guide track carry the double eyelet 96 toward the depending hook 94 of the support member on the spur conveyer system uptil the hook is positioned to engage the upper cross member 98. Then the material holders, still moving in synchronization with the spur conveyer system, drop slightly permitting the support member 88 and its depending hook 94 to engage the double eyelet 96 and support the material being transferred. Meanwhile the hook member 38 on the material holder becomes disengaged from the material. Then the material holders moving along the cam guide track 50 are conducted inwardly away from the spur conveyer system and back toward the main conveyer system to get another load.

It is obvious that the principles disclosed to this point can be utilized in providing a transfer station for the return of material from a spur conveyer system to the main conveyer system. To do this the spur conveyer system could enter a transfer station at what would then be called the first transfer point 21. The cam guide track would have to be shaped a little differently to permit the material holders on the transfer station to take the material from the spur conveyer system and carry it around and inwardly to the main conveyer system. Then at what would be the second transfer point 17, the cam guide track would be shaped to cause the transfer of the material to the main conveyer system. It is clearly apparent, however, that the same basic principles apply in either case.

Referring again to FIGURES 1 and 3, it is evident that in order for the materials carried by the conveyer system to be successfully transferred, the support members 88 and their depending hooks 94 must be properly aligned with hook member 38 on the material holder 28. Frequently material on a conveyer system must be turned from one position to another to satisfy different space requirements and treating conditions. To permit this turning movement, the support members are usually pivotally connected to the conveyer system. Since in this case proper alignment of the hook members 94 is essential for successful transfer of the material from one conveyer system to another, the above mentioned pivotal connection of the support members 88 to the conveyer systems offers a possibility of the hooks 94 being accidentally moved out of alignment and rendering the transfer mechanism inoperative. Accordingly, successful operation of the transfer mechanism requires means for automatically aligning the support members and their depending hooks. As seen in FIGURES 7 and 8, an aligning device, indicated generally at 104, is connected to each support member 88. The aligning device includes three projecting arms, 106, 108 and 110. The arms are in a common plane and are spaced 90° apart. A fourth arm 112 also spaced 90° from the adjacent arms is in a lower parallel plane. This aligning device has a central aperture 114. The upper portion 89 of shank 90 extends through this central aperture and terminates in an alignment member 101, see FIGURE 7. A member 116 is rigidly secured to member 104 as shown in FIGURES 7 and 9. This member has transverse grooves 118 and 120 in its under surface. Alignment member 101 has complementary shaped transverse ribs 103 and 105 which are adapted to fit in one or the other of the grooves. This rib and groove arrangement has the effect of maintaining the alignment of the hook members against minor disturbances. Another feature, as seen in FIGURE 9, is the hook 91 secured to pivot 92, see FIGURES 7 and 9. This permits different length shank elements 90 for support member 88 to be quickly and easily attached to the conveyer system to satisfy changing conditions.

In the event that the hooks 94 of the support members 88 move out of alignment, four depending turning pins 122, 124, 126, 128, are positioned in spaced relationship along the path of the conveyer system in front of the entrance to each transfer station. These turning pins extend below the plane of the three projecting arms 106, 108, and 110, but do not extend below the plane of projecting arm 112. As seen in FIGURE 10, the turning pins and member 104 are set so when the support member 88 and the hooks 94 are properly aligned, the depending pins do not intersect the path of the projecting arms and, of course, cannot reach arm 112. In the example shown in FIGURE 10, as member 104 is carried along by the conveyer system with support member 88 and hook 94 out of alignment, the depending turning pin 122 encounters projecting arm 106. This engagement rotates the support member 88 and hook 94 through an angle of 90°. As further seen in FIGURE 10, this rotation does not move the support member back in alignment, because the next turning pin 124 encounters projecting arm 108, rotating the support member and hook 94 through another angle of 90°. This rotation also does not align the support member and so the continued movement of member 104 along the conveyer system causes turning pin 126 to encounter projecting arm 110. This causes the support member and hook to rotate through another angle of 90°. This puts the support member and depending hook in proper alignment because projecting arm 112 is spaced below the end of turning pin 128 as the member 104 is carried along. The consequence of this is that there is no further engagement between the projecting members and the turning pins to cause the support member to rotate further.

It is evident that in the alignment process, projecting arm 112 plays no part and could in fact, be left out. Its presence there is due to the fact that the projecting arms secured to each support member have a double function. In addition to their use in automatically aligning the support members, they provide a means for turning the material being carried to satisfy space and treatment requirements. For this reason, projecting arm 112 spaced angularly 90° from the adjacent arms permits the support member to be further rotated as desired by positioning a turning pin so it engages that arm as it is moved along.

It will be apparent from the foregoing that a means is provided for transferring articles from one conveyer to another in a manner to achieve a different spacing as between the articles or a different speed in the linear movement of the articles or a different vertical position of the articles being processed so as to adapt the articles for processing by various auxiliary devices. In the specific illustration employed to describe the invention, steel bodies of a coaster wagon are transferred from a main conveyer by which the wagons are carried throughout the plant for processing. Transfer is made to a conveyer by which the wagon bodies are carried through an automatic electrostatic means for applying liquid paint composition and then through a baking oven for setting the applied paint on the steel bodies. In the past, use was made of a dip process for paint application followed by baking at elevated temperatures after an intermediate drainage step. No difficulties arose with respect to the lengths of the hanger rods on which the wagons were suspended. Thus the baking ovens were constructed for use with a short length hanger rod.

When conversion was made for electrostatic painting, it became necessary to suspend the bodies from hanger rods of greater lengths to minimize the application of paint spray onto the carriers. It was found, however, that the ovens previously employed for baking were incapable of use because of the greater length of material supported from the longer rods of the spray conveyer. Thus it became necessary to provide means for taking the bodies from the shorter hanger rods for transfer to rods of greater length during passage through the electrostatic painting system and it became necessary then to return the painted wagon bodies to the shorter rods for subsequent passage through the baking ovens.

Further, during processing and baking, it is possible to provide for a closely spaced relation between the wagon bodies as distinguished from a greater spaced relation that is required to enable the wagon bodies to be turned for the exposure of all surfaces during passage through the electrostatic painting means. Once the paint composition has been applied, a closer spaced relation can again be employed for more efficient use of space, particularly during passage through the baking ovens. Thus it became essential to effect transfer from one conveyer system to another to provide for a greater spaced relation between the bodies during passage through the paint applicator section.

It will be apparent that changes from one conveyer to another will often be required for similar or other purposes and it is to effect these transfers toward which this invention is addressed.

It will be understood that changes may be made in the details of construction, arrangement and operation without departing from the spirit of the invention, especially as defined in the following claims.

I claim:

1. A station for automatially transferring material from one moving conveyer system to another, comprising one conveyer system on which the material to be transferred is brought to the station, another conveyer system to which the material is transferred from the station, a fixed support associated with said conveyers, a movable support mounted on said fixed support for movement along a predetermined path in a plane, motive means connected to said movable support, material holders movably mounted in spaced relation on said movable support, each of said material holders including a base portion and an extensible portion, each base portion being pivotally connected to said movable support to permit rocking movement of the material holders relative to the movable support, a material holding unit on each of said extensible portions, a fixed guide track, each of said extensible portions having a guide portion riding in said guide track being, said guide track so shaped that the motion of said movable support and the engagement between the guide portion on the material holder and the guide track conducts the material holding units in succession to a first transfer point in the station to be loaded with material arriving on the one conveyer system and to a second transfer point adjacent the other moving conveyer system for transfer of the held material to said other moving conveyer system.

2. A station for automatically transferring material from one moving conveyer system to another, comprising one conveyer system on which the material to be transferred is brought to the station, another conveyer system to which the material is transferred from the station, a fixed support associated with said conveyers, a movable support rotatably mounted on said fixed support, means for rotating said movable support, material holders movably mounted on said movable support in spaced relation, each of said material holders including a base portion and an extensible portion, each base portion pivotally connected to said movable support for rocking movement relative to the support, a material holding unit on each of said extensible portions, a guide track, each of said extensible portions having a guide portion riding in said guide track, said guide track so shaped that the rotation of the movable support and the engagement between the guide portion on the material holder and the guide track causes said material holding units to be conducted in succession to a first transfer point in the station to be loaded with material arriving on the one conveyer system and to a second transfer point adjacent the other moving conveyer system for transfer of the held material to said other moving conveyer system.

3. A station for automatically transferring material from one moving conveyor system to another comprising one conveyer system on which the material to be transferred is brought to the station, another conveyer system to which the material is transferred from the station, a fixed support associated with said conveyers, a shaft rigidly mounted on said fixed support, a support disk rotatably mounted on said shaft, driving means connected to said support disk for rotating it, material holders mounted on said support disk in spaced relation, each of said material holders including a base portion and an extensible portion, each base portion pivotally connected to said support disk to permit rocking movement relative to the support, a material holding unit on each of said extensible portions, a cam guide track, each of said extensible portions having a guide portion riding in said cam guide track, said cam guide track so shaped that in cooperation with the speed of rotation of said support disk and the spacing of the material holders on the support disk, each successive holder is conducted for loading to a first transfer point in the station at the same speed and in synchronization with material arriving on the one conveyer system, and to a second transfer point to transfer in succession the held material to said other moving conveyer system.

4. A station for automatically transferring material from one moving conveyer system to another, comprising a fixed support, a shaft rigidly mounted on said fixed support, a support disk rotatably mounted on said shaft, driving means connected to said support disk for rotating it, material holders mounted on said support disk in spaced angular relationship around the axis of said disk, each of said material holders including a base portion and an extensible portion, each base portion pivotally connected to said support disk to permit movement of the material holders in a plane transverse to the plane of rotation of the support disk, a material holding unit mounted on each of said extensible portions, a cam guide track, each of said extensible portions having a guide portion riding in said cam guide track, said cam guide track having a portion at a first transfer point positioned adjacent material arriving on one conveyer system, said cam guide portion at a distance from the axis of said support disk such that the linear velocity of the material holding unit at the first transfer point is substantially equal to the speed of said one moving conveyer system, the angular spacing of the material holders on the support disk and the speed of rotation of that disk so adjusted that each material holding unit arrives for loading at the first transfer point in substantial synchronization with the arrival of material on said one conveyer system, said guide track further conducting the loaded material holding units to a second transfer point, said guide track adjacent said second transfer point at a distance from the rotational axis of the support disk such that the linear velocity of the material holding units at the second transfer point is substantially equal to the speed of the other conveyor system, the arrival of the loaded material holding units at the second transfer point adapted to be synchronized with the holding means on the other conveyer system for the transfer of the material to that system.

5. A station for automatically transferring material from support members pivotally suspended below one moving conveyer system to support members pivotally suspended below another moving conveyer system, comprising a fixed support, a movable support mounted on said fixed support, motive means connected to said movable support, material holders movably mounted on said movable support, synchronization and guide means connected to said material holders to cause them to move in succession to a first transfer point in the station to be loaded with material arriving on one moving conveyor system, said synchronization and guide means further moving the loaded material holders to a second transfer point adjacent the other moving conveyor system and causing them to transfer in succession the held material to said other moving conveyer system, said synchronization and guide means further including steadying means for steadying the pivotally suspended support members on at least one of said moving conveyer systems.

6. A station for automatically transferring material from support members pivotally suspended below one moving conveyer system to support members pivotally suspended below another moving conveyer system, comprising a fixed support, moving support means mounted on said fixed support, said moving support means following an orbit equidistant from a line, material holders movably mounted on said moving support means, each of said material holders including a base portion and an extensible portion, each base portion connected to said moving support means, a material holding unit on each of said extensible portions, a guide track, each of said extensible portions having a guide portion riding in said guide track, said guide track having a portion at a first transfer point in the station, said guide track portion at a distance from said line such that the linear velocity of the material holding units at the first transfer point is substantially equal to the speed of said one moving conveyer system, and the angular spacing of the material holders on the moving support means and the speed of movement such that each material holding unit is conducted to the first transfer point in the station for loading in synchronization with the arrival of material arriving on said one moving conveyer system, said guide track further conducting the loaded material holding units to a second transfer point to transfer in succession the held material to said other moving conveyer system, steadying means movably connected to said fixed support, said steadying means engaging and steadying the pivotally suspended support members on at least one of said moving conveyer systems.

7. A station for automatically transferring material from support members pivotally suspended below one moving conveyer system to support members pivotally suspended below another moving conveyer, comprising a fixed support, a shaft rigidly connected to said fixed support, a support disk rotatably mounted on said shaft, driving means connected to said support disk for rotating it, material holders mounted on said support disk in spaced angular relationship around the axis of said disk, each of said material holders including a base portion and an extensible portion, each base portion pivotally connected to said support disk to permit movement of the material holders in a plane transverse to the plane of rotation of the support disk, a material holding unit mounted on each of said extensible portions, a cam guide track, each of said extensible portions having a guide portion riding in said cam guide track, said cam guide track having a portion at a first transfer point in the station positioned adjacent material arriving on said one conveyer system, said cam guide portion at a distance from the axis of said support disk such that the linear velocity of the material holding unit at the first transfer point is substantially equal to the speed of said one moving conveyer system, the angular spacing of the material holders on the support disk and the speed of rotation of that disk so adjusted that each material holding unit arrives for loading at the first transfer point in substantial synchronization with the arrival of material on said one conveyer system, said guide track further conducting the loaded material holding units to a second transfer point, said guide track adjacent said second transfer point at a distance from the axis of said support disk such that the linear velocity of the material holding units at the second transfer point is substantially equal to the speed of the other moving conveyor system, the arrival of the loaded material holding units at the second transfer point adapted to be synchronized with the support members on the other conveyer system for the transfer of material to that system, and steadying means movably connected to said fixed support, said steadying means engaging and steadying the pivotally suspended support members on at least one of said moving conveyer systems.

8. The apparatus set forth in claim 7 wherein the steadying means includes a wheel rotatably mounted on said shaft, said wheel having a hub and a peripheral portion, spoke members rigidly connected between said hub and said peripheral portion, rod members connected at one end to said hub and at the other to a fork member, said rod members positioned around the axis of the wheel in angular spaced relation, one portion of the periphery of the wheel parallel to and substantially tangent with a portion of one of the conveyer systems, projections on the periphery of the wheel positioned to be engaged by said one conveyer system so that the peripheral velocity of the wheel is equal to the speed of that conveyer system, a fixed guide strip in close parallel relationship to said portion of the periphery of the wheel, said fixed guide strip positioned so that the incoming support members on said one conveyer system pass between the periphery of the wheel and said fixed guide strip, the spacing of said fork members on the wheel set to be synchronized with the arrival of the pivotally suspended support members on said one conveyer system so that the support members are forced between the tines of the fork and the guide strip so they can be steadied.

9. The apparatus set forth in claim 7 wherein the steadying means includes a wheel rotatably mounted on said shaft, said wheel having a hub and a peripheral portion, spoke members rigidly connected between said hub and said peripheral portion, rod members positioned in spaced angular relationship around the axis of said wheel, said rod members pivotally connected at one end to said hub and pivotally connected at the other end to a vertical slide bar, a radially extending fork member connected to one end of the vertical slide bar, one portion of the periphery of the wheel parallel to and substantially tangent with a portion of one of the conveyer systems, projections on the periphery of the wheel positioned to be engaged by said one of the conveyer systems so that the peripheral velocity of the wheel is substantially equal to the speed of the said one conveyer system, a fixed guide strip in close parallel relationship to said one portion of the periphery of the wheel, said fixed guide strip and wheel positioned so the support members on said one conveyer system pass between the periphery of the wheel and the fixed guide strip, guide ways mounted on the periphery of the wheel, said slide bars riding in said guide ways, the spacing of said slide bars and forks on said wheel set to move the fork members in synchronization with the arrival of the pivotally connected support members on said one conveyer system so that the support members are forced between the tines of the fork and the guide strip for steadying them, a cam surface rigidly secured to said fixed support, said rod members having a depending portion riding on said cam surface, said cam surface so shaped that the engagement of the depending portion of the rod members with the cam surfaces pivots the rod members and raises and lowers the fork member in the guide ways over obstructions adjacent the station.

10. An apparatus for rotating and aligning material support members pivotally connected to a conveyer system, comprising three projecting alignment members secured to each of said material support members, said projecting alignment elements positioned in a common plane and spaced 90° apart around the axis of said pivotal connection, four turning pins secured to a fixed support and positioned along the path of said conveyer system, said turning pins intersecting the planes of said projecting alignment members, said turning pins and said projecting alignment members so positioned that only when the support member is in alignment there is no engagement between said projecting aligning members and said turning pins as the support member moves past them, each engagement between said turning pin and said projecting aligning members rotating said support member 90° until the support member is again in alignment.

11. An article of manufacture comprising an integral member having a central axis, said integral member having one surface with three identical outwardly projecting elements spaced 90° apart, a second surface rigidly connected to said first surface in spaced parallel relationship, a projecting member on said second surface spaced around said axis 90° from adjacent projecting members.

12. A station for automatically transferring material from support members pivotally suspended below one moving conveyer system to support members pivotally suspended below another moving conveyer system comprising a fixed support, a movable support mounted on said fixed support, motive means connected to said movable support to continuously drive it, material holders movably and directly mounted on said movable support, synchronization and guide means connected to said material holders to cause them to move in succession to a first transfer point in the station to be loaded with material arriving on one moving conveyer system, said synchronization and guide means further moving the loaded material holders to a second transfer point adjacent the other moving conveyer system and causing them to be synchronized with support members on said other conveyer system only at the second transfer point for transferring material to them.

13. A station for automatically transferring material from support members pivotally suspended below one moving conveyer system to support members pivotally suspended below another moving conveyer system comprising a fixed support, at least one material holder movably mounted on said fixed support, synchronizing and guide means connected to said material holder to cause it to move to a first transfer point in the station to be automatically loaded with material arriving on one conveyer system, said synchronizing and guide means further moving the loaded material holder to a second transfer point adjacent the other moving conveyer system and causing it to transfer the held material to said other moving conveyer system, and means for steadying the pivotally suspended support members on at least one of said moving conveyer systems.

14. An apparatus of the class described comprising a shaft, a wheel rotatably mounted on said shaft, said wheel having a hub and a peripheral portion, spoke members rigidly connected between said hub and said peripheral portion, rod members connected at one end to said hub and at the other end to a fork member, said rod members positioned around the axis of the wheel in angularly spaced relation, at least a portion of the periphery of the wheel adapted to be parallel to and tangent with a portion of a conveyer system having pivotally suspended support members, projections on the periphery of the wheel, said projections adapted to be engaged by the said conveyer system so that the peripheral velocity of the wheel will be equal to the speed of the said conveyer system, a fixed guide strip in close parallel relationship to said portion of the periphery of the wheel, said fixed guide strip positioned so that incoming support members on said conveyer system will pass between the periphery of the wheel and the said fixed guide strip, the spacing of said fork members on the wheel adapted to be synchronized with the arrival of the pivotally suspended members on said one conveyer system so that the support members will be forced between the tines of the fork and the guide strip and steadied thereby.

15. A station for automatically transferring material from one conveyer moving at one speed to another conveyer moving at a different speed and in spaced relation to the first conveyer comprising a fixed support, a moving support means mounted on said fixed support for rotational movement about an axis between said conveyers and spaced closer to the conveyer of slower speed, motive means operatively connected to said movable support for rotational movement of same relative to the fixed support about its axis, material holders operatively connected to said movable support for movement therewith about the axis, each of said material holders including a base portion secured to the movable support and a portion shiftable radially relative to the base portion to vary the distance from the axis of rotation while concurrently proportionally varying the linear speed of said radially shiftable portion, a material-holding unit on each of said radially shiftable portions, a guide track, a portion on each of said radially shiftable portions operatively connected to said guide track for movement therein, said guide track controlling the radial movement of said radially shiftable portion of the material holder to bring the material-holding unit in alignment with the conveyer at one transfer point and at a distance from the axis to provide for linear movement corresponding with the movement of the conveyer for transfer of material from the conveyer to the material-holding unit and to bring the material-holding unit in alignment with the other conveyer at another transfer point spaced a distance from the axis to provide for a linear movement corresponding to the movement of said other conveyer for transfer of the material from the material-holding unit to the other conveyer.

References Cited in the file of this patent

UNITED STATES PATENTS

| | | |
|---|---|---|
| 1,461,222 | Myers | July 10, 1923 |
| 1,951,400 | Dvorak | Mar. 20, 1934 |
| 2,120,052 | Bishop | June 7, 1938 |
| 2,546,374 | Rayburn | Mar. 27, 1951 |

FOREIGN PATENTS

| | | |
|---|---|---|
| 728,640 | Great Britain | Apr. 20, 1955 |